(12) United States Patent
Sherman et al.

(10) Patent No.: US 8,069,282 B2
(45) Date of Patent: Nov. 29, 2011

(54) SD SWITCH BOX IN A CELLULAR HANDSET

(75) Inventors: Itay Sherman, Hod Hasharon (IL); Eyal Bychkov, Hod Hasharon (IL); Yaron Segalov, Tel Aviv (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/876,129

(22) Filed: Sep. 4, 2010

(65) Prior Publication Data

US 2011/0014951 A1 Jan. 20, 2011

Related U.S. Application Data

(62) Division of application No. 11/827,525, filed on Jul. 11, 2007, now Pat. No. 7,970,433.

(60) Provisional application No. 60/933,792, filed on Jun. 8, 2007.

(51) Int. Cl.
*G06F 3/00* (2006.01)

(52) U.S. Cl. .............. 710/36; 710/48; 710/74; 710/107; 710/108

(58) Field of Classification Search ........................ None
See application file for complete search history.

(56) References Cited

U.S. PATENT DOCUMENTS

| | | | |
|---|---|---|---|
| 5,625,673 A | 4/1997 | Grewe et al. | |
| 5,628,055 A | 5/1997 | Stein | |
| 5,809,115 A | 9/1998 | Inkinen | |
| 5,890,016 A * | 3/1999 | Tso | 710/64 |
| 5,893,037 A | 4/1999 | Reele et al. | |
| 5,907,815 A | 5/1999 | Grimm et al. | |
| 5,913,227 A * | 6/1999 | Raz et al. | 711/152 |
| 5,928,367 A * | 7/1999 | Nelson et al. | 714/6.3 |
| 6,188,917 B1 | 2/2001 | Laureanti | |
| 6,201,867 B1 | 3/2001 | Koike | |
| 6,243,578 B1 | 6/2001 | Koike | |
| 6,477,357 B1 | 11/2002 | Cook | |
| 6,516,202 B1 | 2/2003 | Hawkins et al. | |
| 6,640,113 B1 | 10/2003 | Shin et al. | |
| 6,690,947 B1 | 2/2004 | Tom | |
| 6,898,283 B2 | 5/2005 | Wycherley et al. | |
| 6,907,264 B1 | 6/2005 | Sterkel | |
| 6,999,792 B2 | 2/2006 | Warren | |
| 7,085,542 B2 | 8/2006 | Dietrich et al. | |

(Continued)

FOREIGN PATENT DOCUMENTS

EP 1871075 A1 12/2007

(Continued)

*Primary Examiner* — Eron J Sorrell
(74) *Attorney, Agent, or Firm* — Soquel Group LLC

(57) ABSTRACT

A method for arbitrating between a host device and a cellular base band mode for use of a shared SD storage, including requesting, by a cellular base band modem from a host device, access to an SD storage, including writing an access request message, notifying the host device of the access request message, reading, by the host device, the access request message, granting, by the host device, the access request, including writing an access grant message, notifying the cellular base band modem of the access grant message, reading, by the cellular base band mode, the access grant message, holding an SD host bus in a busy state, thereby forcing the host device to hold and not access the bus, accessing, by the cellular base band modem, the SD storage, and upon completion of the accessing, removing the busy state from the SD host bus.

15 Claims, 11 Drawing Sheets

U.S. PATENT DOCUMENTS

| | | |
|---|---|---|
| 7,194,285 B2 | 3/2007 | Tom |
| 7,266,391 B2 | 9/2007 | Warren |
| 7,596,666 B2 * | 9/2009 | Ahn et al. .............. 711/149 |
| 7,827,337 B2 * | 11/2010 | Jeong .............. 710/113 |
| 2002/0090980 A1 | 7/2002 | Wilcox et al. |
| 2002/0151327 A1 | 10/2002 | Levitt |
| 2003/0084287 A1 * | 5/2003 | Wang et al. .............. 713/168 |
| 2004/0233930 A1 | 11/2004 | Colby, Jr. |
| 2004/0268005 A1 | 12/2004 | Dickie |
| 2005/0070225 A1 | 3/2005 | Lee |
| 2005/0159184 A1 | 7/2005 | Kermer et al. |
| 2006/0003804 A1 | 1/2006 | Liu |
| 2006/0105722 A1 | 5/2006 | Kumar |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0026794 A1 | 1/2008 | Warren |
| 2008/0040354 A1 | 2/2008 | Ray et al. |
| 2008/0140886 A1 | 6/2008 | Izutsu |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |
| WO | WO 2006126777 A1 * | 11/2006 |

* cited by examiner ns # US 8,069,282 B2

SD SWITCH BOX IN A CELLULAR HANDSET

PRIORITY REFERENCE TO RELATED APPLICATIONS

This application is a divisional of U.S. application Ser. No. 11/827,525, entitled SD SWITCH BOX IN A CELLULAR HANDSET, filed on Jul. 11, 2007 now U.S. Pat. NO. 7,970,433 by inventors Itay Sherman, Eyal Bychkov and Yaron Segalov, which claims benefit of U.S. Provisional Application No. 60/933,792, entitled SD SWITCH BOX IN A CELLULAR HANDSET, filed on Jun. 8, 2007 by inventors Itay Sherman, Eyal Bychkov and Yaron Segalov.

FIELD OF THE INVENTION

The field of the present invention is cellular modems.

BACKGROUND OF THE INVENTION

Today's conventional cellular handset includes a cellular base band modem. The base band modem does not have built-in non-volatile memory, and has limited internal volatile memory (SRAM). For use of non-volatile memory, a cellular modem may be connected to a NOR flash memory, and also to additional external SDRAM.

When booting up, a cellular modem generally accesses the NOR flash memory to execute a code image that is stored therein. The cellular modem may access such code image directly, or by first copying it to its internal SRAM.

Many cellular modems also support a peripheral boot mode, through which they load a secondary code image from an external port, such as a UART port or a USB port, which is connected to an external device, such as a PC computer, which loads the secondary code image via a peripheral interface. The secondary code image is then used to re-program the NOR flash memory with new image code. Peripheral boot mode is typically used for program development and debugging via a PC.

High end cellular handsets also have NAND flash memory coupled thereto. In such case, the NAND flash memory is used for code and data storage. The NAND flash memory is connected via a dedicated NAND controller embedded in the cellular base band modem, or via an SD bus to an external SD controller that is connected to the NAND flash. For cellular handsets that have NAND flash memory, access to the NAND flash is performed via the cellular base band modem.

Cellular handsets may support connection to an external device host, such as a PC computer. In such case, the handset provides the host access to its internal NAND flash memory. Host access to NAND flash memory is generally performed over a USB connection, where the internal NAND memory is mapped as a mass storage drive on the host. The handset thus operates as a USB device, which is a slave, and the host operates as a USB host, which is a master.

Reference is now made to FIG. 1, which is a simplified block diagram of a prior art cellular handset 100. Handset 100 includes a cellular base band modem 110 with an external memory interface (EMIF) 120 for accessing a NAND flash storage 130 and an SDRAM storage 140. Correspondingly, EMIF 120 includes a NAND controller 150 and an SDRAM controller 160, respectively.

Many consumer electronic (CE) devices, such as MP3 song players and MP4 movie players, support connection to non-volatile storage elements, the most common storage element being SD memory and its variants including inter alia Mini SD and Micro SD. The CE device operates as a host, which is a master, and the SD memory operates as a slave.

It would thus be desirable to be able to connect CE devices that support SD connections with cellular modems, in order to enhance the CE devices with modem functionality. However, many challenges have to be overcome in doing so. Some of these challenges are:

How is the cellular modem booted up?
How does the CE device communicate with the cellular modem?
How is the cellular modem transition in and out of sleep mode carried out?
How are conflicts resolved when both the CE device and the cellular modem want to access SD memory at the same time?

SUMMARY OF THE DESCRIPTION

Aspects of the present invention concern a design for a cellular handset that is connected to a CE host device, and enhances the CE device with modem functionality. The CE host device supports SD connection. Examples of such host devices abound and include inter alia digital cameras, personal data assistants (PDAs), MP3 music players, MP4 movie players, TVs with SD slots, laptop PCs and GPS navigational systems.

In addition to enhancing the CE host with modem functionality, connection of the cellular handset to the CE host also serves to enhance the host with the storage capabilities of the modem.

The special design of the present invention enables a cellular base band modem within the handset to bypass NOR flash memory when booting up, enables communication between the cellular base band modem and the CE host, and enables the cellular base band modem to switch in and out of sleep mode without loss of state parameters and code image.

In accordance with an embodiment of the present invention, a convergence controller is used to couple the CE host device with the handset's cellular base band modem and with the handset's NAND flash memory. The convergence controller serves as an SD switch box, which connects two SD devices, namely, the cellular base band modem and the CE device, and enables switching access to SD storage between the two SD devices.

The convergence controller includes a communication mechanism through which the cellular base band modem and the CE host device communicate with one another. Such communication mechanism includes a first mailbox via which the cellular base band modem sends a message to the CE host, and a second mailbox via which the CE host sends a message to the cellular base band modem.

The two mailboxes are used to resolve conflicts when both the CE host and the cellular base band modem want to access SD memory at the same time. The cellular base band modem sends an access request message to the CE host via the first mailbox, and the CE host responds by sending an access granted message to the cellular base band modem via the second mailbox.

There is thus provided in accordance with an embodiment of the present invention a cellular handset, including a cellular base band modem, including a UART interface, and an SD host interface, a NAND flash memory, a NAND controller coupled with the NAND flash memory, a host device including a host controller, wherein the electronic host device supports an SD connection, and a convergence controller coupled with the cellular base band modem, the host device and the NAND controller, including a UART port for transferring data to and from the cellular base band modem via the UART interface, an SD port for transferring data to and from the cellular base band modem via the SD host interface, an SD port for transferring data to and from the NAND flash memory via the NAND controller, an SD port for transferring data to and from the host device via the host controller, a first mailbox into which the base band modem writes messages and from which the host device reads messages, and a second mailbox into which the host device writes messages and from which the cellular base band modem reads messages.

There is additionally provided in accordance with an embodiment of the present invention a cellular handset, including a cellular base band modem, including a UART interface, and an SD host interface, a NAND flash memory, a host device including a host controller, wherein the electronic host device supports an SD connection, and a convergence controller coupled with the cellular base band modem, the host device and the NAND controller, including a UART port for transferring data to and from the cellular base band modem via the UART interface, an SD port for transferring data to and from the cellular base band modem via the SD host interface, a NAND controller coupled with the NAND flash memory, an SD port for transferring data to and from the host device via the host controller, a first mailbox into which the base band modem writes messages and from which the host device reads messages, and a second mailbox into which the host device writes messages and from which the cellular base band modem reads messages.

There is moreover provided in accordance with an embodiment of the present invention a method for booting a cellular base band modem, including booting a cellular base band modem in a peripheral mode, reading a boot code image from a NAND flash memory, loading the boot code image to internal SRAM of the cellular base band modem, executing the boot code, by the cellular base band modem, loading a full code image from the NAND flash memory to the internal SRAM of the cellular base band modem, and accessing, by the cellular base band mode, the NAND flash memory via an SD port as a standard memory card.

There is further provided in accordance with an embodiment of the present invention a method for communicating between a host device and a cellular base band mode, including requesting, by a cellular base band modem from a host device, access to an SD storage, including writing an access request message to a first mailbox, notifying the host device of the message in the first mailbox, including issuing an interrupt request to the host device, reading, by the host device, the message in the first mailbox, granting, by the host device, the access request, including writing a grant message to a second mailbox, wherein the grant message is the first block of a multi-block write, notifying the cellular base band modem of the message in the second mailbox, including issuing an interrupt request to the cellular modem, reading, by the cellular base band mode, the message in the second mailbox, including recognizing the first block as a grant message, holding an SD host bus in a busy state, thereby forcing the host device to hold and not access the bus, accessing, by the cellular base band modem, the SD storage, and upon completion of the accessing, removing the busy state from the SD host bus.

There is yet further provided in accordance with an embodiment of the present invention a method for a cellular base band modem to transition in and out of a sleep mode, including when a cellular base band modem is idle for a long period of time: backing up state parameters in an internal SRAM, setting a secondary boot code as the code to be executed upon resumption of power, setting a timer for resumption of power, halting internal CPU operation, and disconnecting power to an external SDRAM, and when the timer has expired: reconnecting power to the external SDRAM, loading the secondary boot code, and loading a full code image to the external SDRAM.

BRIEF DESCRIPTION OF THE DRAWINGS

The present invention will be more fully understood and appreciated from the following detailed description, taken in conjunction with the drawings in which.

DETAILED DESCRIPTION

Figure 1:
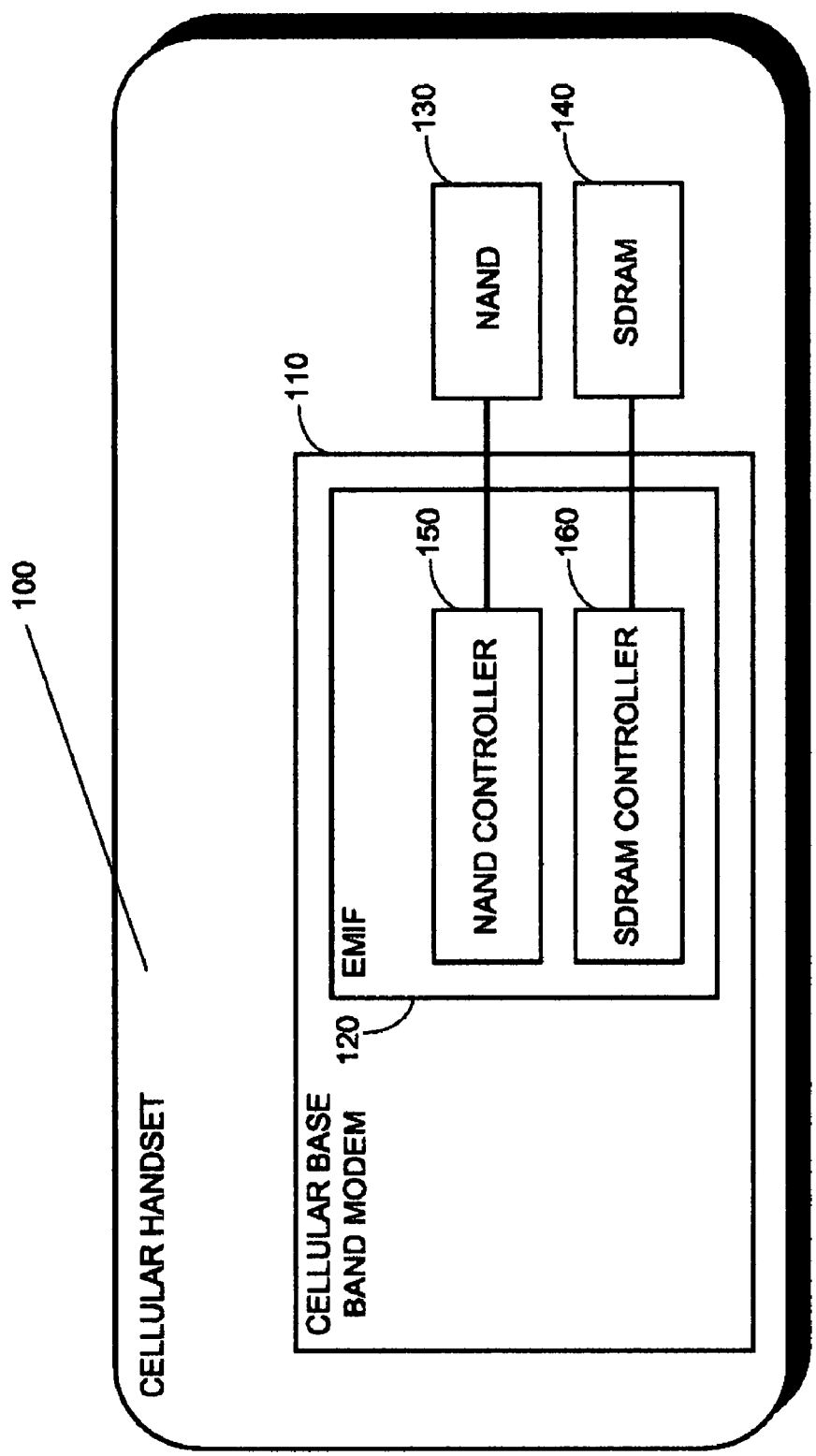
FIG. 1 is a simplified block diagram of a prior art cellular handset.
Figure 2:
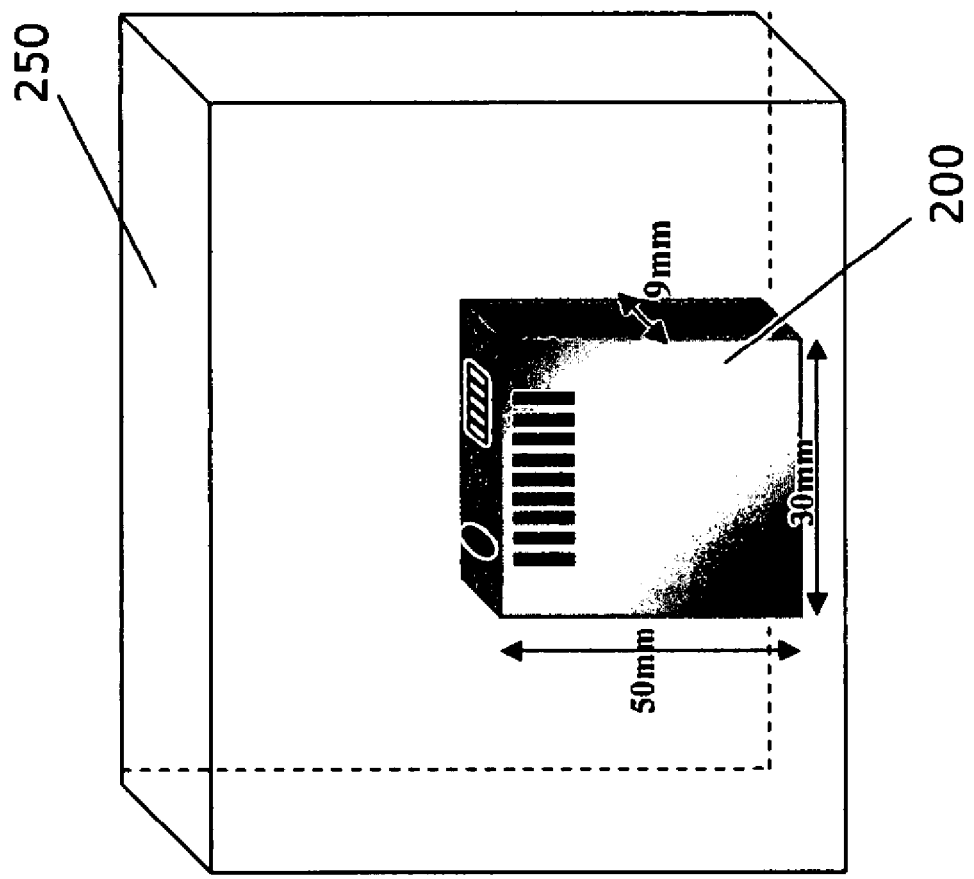
FIG. 2 is a simplified drawing of a handset coupled with a CE device, in accordance with an embodiment of the present invention.

Aspects of the present invention relate to cellular handsets that are coupled with consumer electronic (CE) host devices, with the host devices operating as master and the cellular handsets operating as slave. The cellular handsets enhance and augment the CE host devices by providing the hosts with modem functionality. In this regard, reference is now made to FIG. 2, which is a simplified drawing of a handset 200 coupled with a CE device 250, in accordance with an embodiment of the present invention.

Convergence Controller

A convergence controller is used to couple the CE host device with a cellular handset modem. When the host device and the cellular modem are coupled, they share use of cellular handset NAND flash memory. The convergence controller serves as an SD switch box, which connects two SD devices, namely, the cellular modem and the CE device, and enables switching access to SD storage between the two SD devices.

Figure 3:
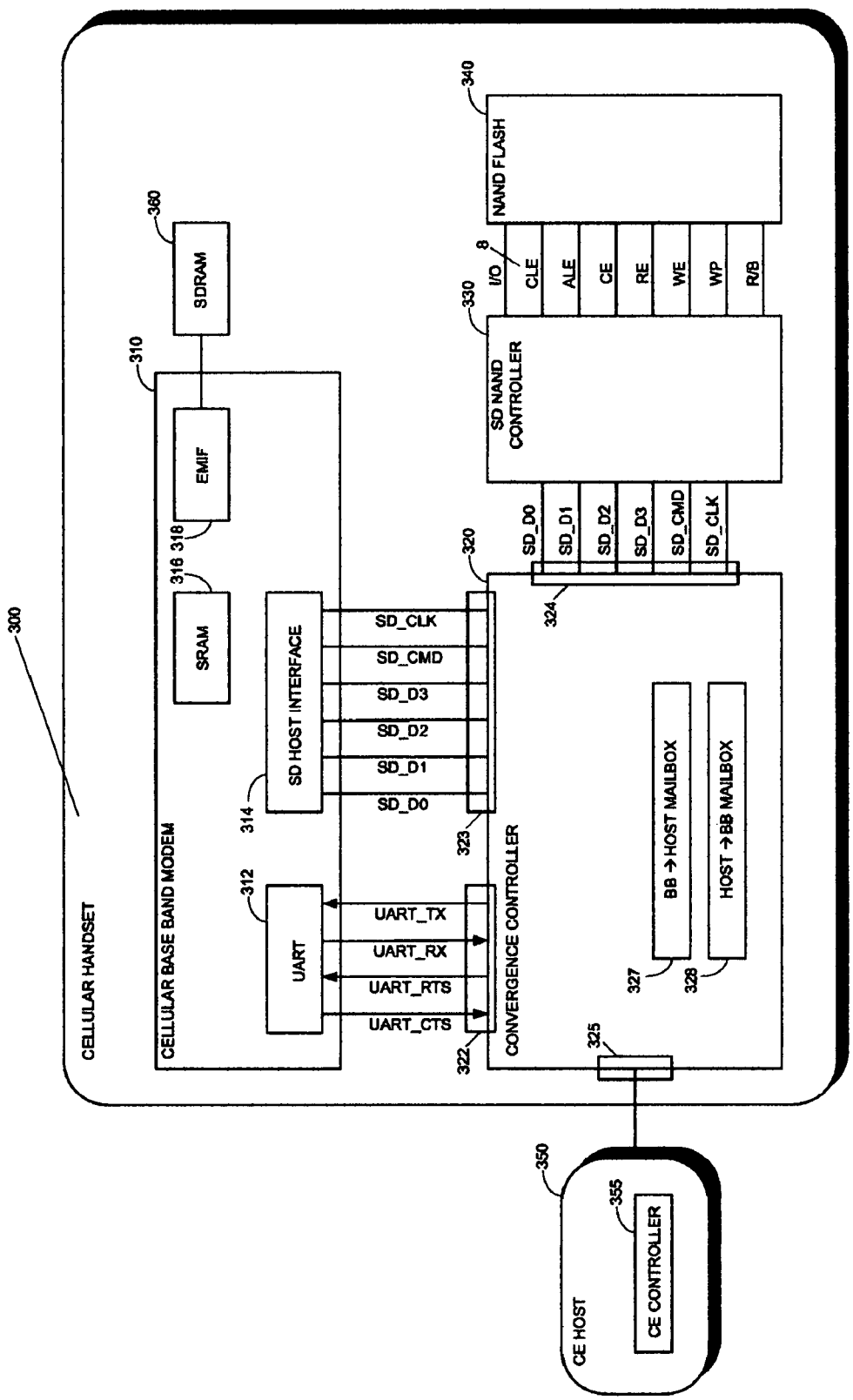
FIG. 3 is a simplified block diagram of a cellular handset, in accordance with a first embodiment of the present invention.

Reference is now made to FIG. 3, which is a simplified block diagram of a cellular handset 300, in accordance with a first embodiment of the present invention. Handset 300 includes a cellular base band modem 310, a dedicated convergence controller 320, a NAND controller 330, and NAND flash memory 340.

Convergence controller 320 is connected to base band modem 310 via both a UART port 322 and a base band SD host port 323. Correspondingly, base band modem 310 includes a UART interface 312 and an SD interface 314, respectively.

Convergence controller 320 is connected to an SD NAND controller 330 via an SD port 324. During normal operation, base band modem 310 accesses NAND flash memory 340 via SD port 324.

Convergence controller 320 also includes an external SD port 325 for connecting to a consumer electronic (CE) host 350 that supports SD connections. Handset 300 may plug in to CE host 350 or connect to CE host 350 via cable. When handset 300 and CE host 350 are connected, CE host 350 accesses NAND flash memory 340 via convergence controller 320. It is noted that access to NAND flash memory 340 is not required to pass through base band modem 310. As such, base band modem 310 may be in sleep mode or shutdown mode during operations between CE host 350 and NAND flash memory 340.

For memory storage, handset 300 includes an internal SRAM memory 316, and an external memory interface (EMIF) 318 connected to an SDRAM memory 360.

Booting Base Band Modem 310

Figure 4:
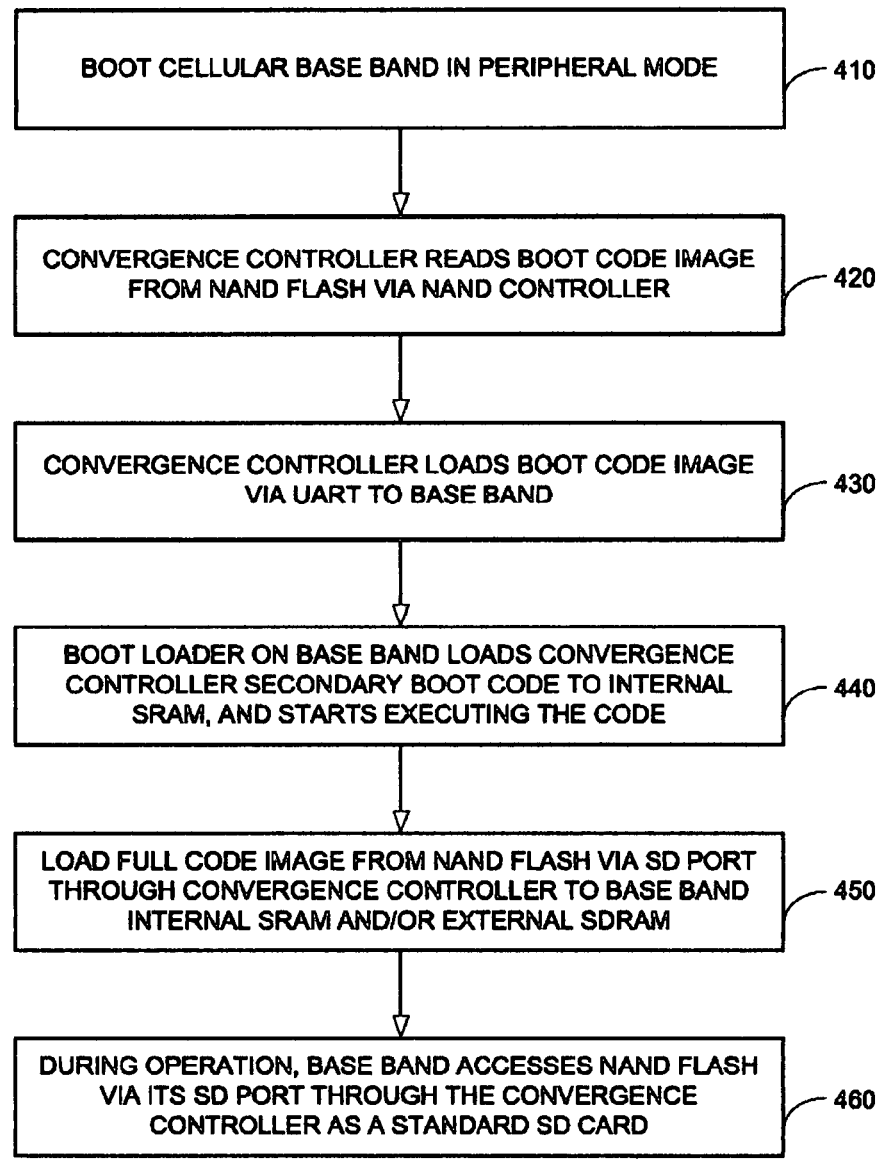
FIG. 4 is a simplified flowchart of a method for booting a cellular modem and performing subsequent operations, in accordance with an embodiment of the present invention.

Reference is now made to FIG. 4, which is a simplified flowchart of a method for booting cellular base band modem 310, and for performing subsequent operations, in accordance with an embodiment of the present invention. At step 410 the base band modem is booted in peripheral mode. In general, when a base band modem is booted in peripheral mode, the internal ROM code in the modem looks for code that is input via a peripheral interface, including inter alia a UART or a USB interface. The base band modem retrieves such code and transfers it to internal SRAM 316, and then transfers control to SRAM 316.

At step 420 convergence controller 320 reads a secondary boot code image from NAND flash 340, via NAND controller 330. At step 430 convergence controller 320 loads the secondary boot code image via its UART port 322 to base band modem 310.

At step 440 a boot loader of base band modem 310 loads the secondary boot code to internal SRAM 316, and begins executing the secondary boot code. At step 450 the executing code loads the full code image from NAND flash 340 via convergence controller's SD port 324, to internal SRAM 316 or to external SDRAM 360, or to both. At step 460, during operation, base band modem 310 accesses NAND flash 340 via convergence controller's SD port 324, as a standard SD memory card.

Communication Between Base Band Modem 310 and CE Host 350

In accordance with an embodiment of the present invention, base band modem 310 communicates with CE host 350 via a controller 355, using mailboxes implemented in convergence controller 320. Specifically, convergence controller includes two mailboxes, a mailbox 327 that is written to by base band modem 310 and read from by CE host 350, and a mailbox 328 that is written to by CE host 350 and read from by base band modem 310. Convergence controller 320 initiates an interrupt to CE controller 355 when base band modem 310 completes a write operation to mailbox 327. Such interrupt may be implemented as an SDIO interrupt on an SD bus, or as a dedicated signal. Similarly, CE controller 355 initiates an interrupt to base band modem 310 when CE host 350 completes a write operation to mailbox 328.

It will thus be appreciated by those skilled in the art that mailboxes 327 and 328 may be used for direct transfer of data between base band modem 310 and CE host 350. In one embodiment of the present invention, each mailbox 327 and 328 includes 512 bytes, of which the first two bytes are header bytes that store a message type, and the remaining bytes store the message itself.

Mailboxes 327 and 328 may be mapped to an SDIO register map on the base band modem side and on the CE host side. Alternatively, mailboxes 327 and 328 may be mapped to SD memory space. In such case an arbitration algorithm is used to resolve conflicts when both CE host 350 and base band modem 310 try to access SD storage at the same time.

Figure 5:
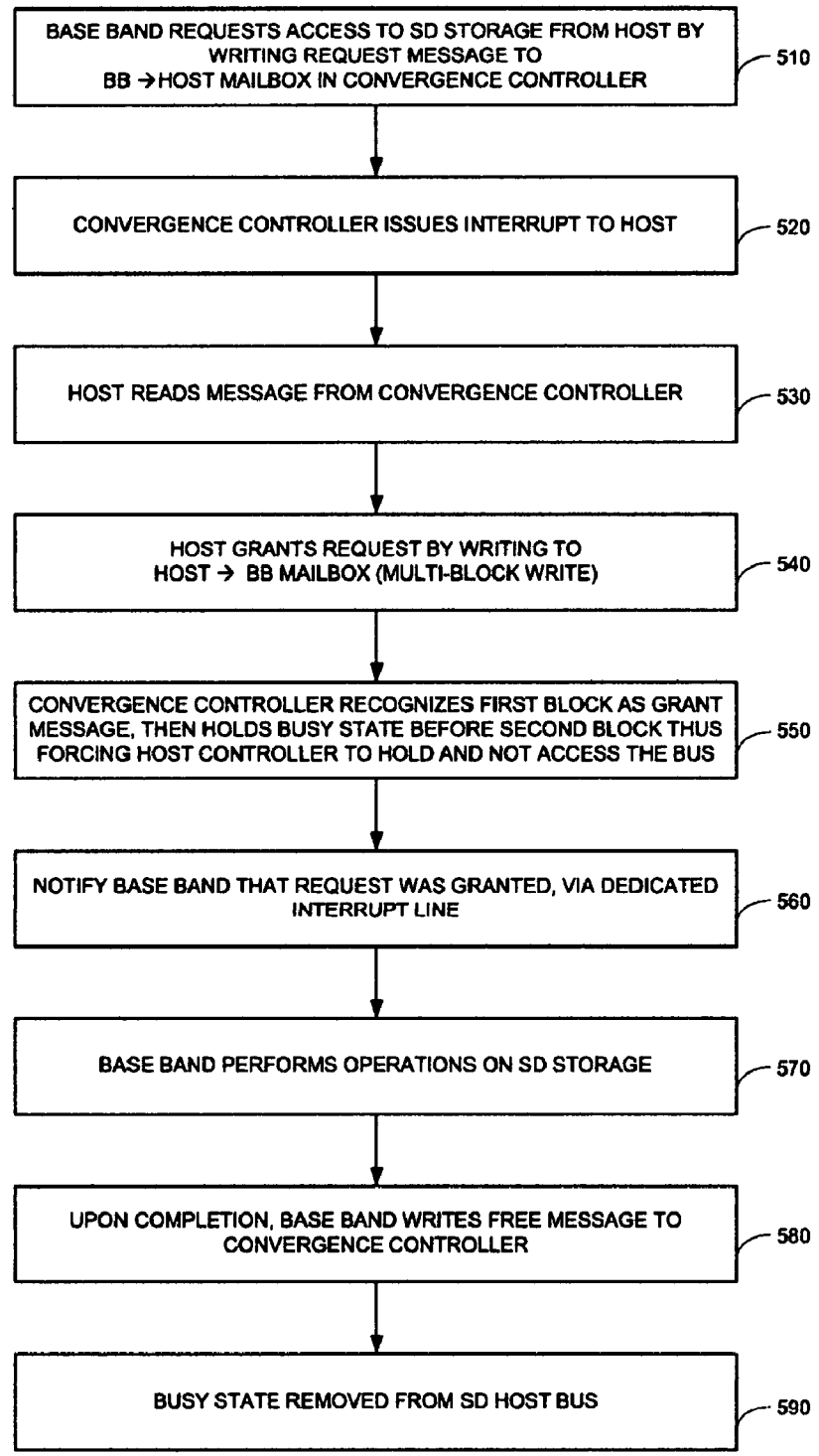
FIG. 5 is a simplified flowchart of a method for communicating between a CE host and a cellular base band, and accessing SD storage, in accordance with an embodiment of the present invention.

Reference is now made to FIG. 5, which is a simplified flowchart of a method for communicating between CE host 350 and cellular base band modem 310, and accessing SD storage 340, in accordance with an embodiment of the present invention. At step 510, base band modem 310 requests access to SD storage 340 from the CE host 350, by writing an access request message to mailbox 327. At step 520 convergence controller 320 issues an interrupt to CE host 350, to notify CE host of the message that was written. At step 530 CE host 350 reads the message from mailbox 327.

Figure 6:
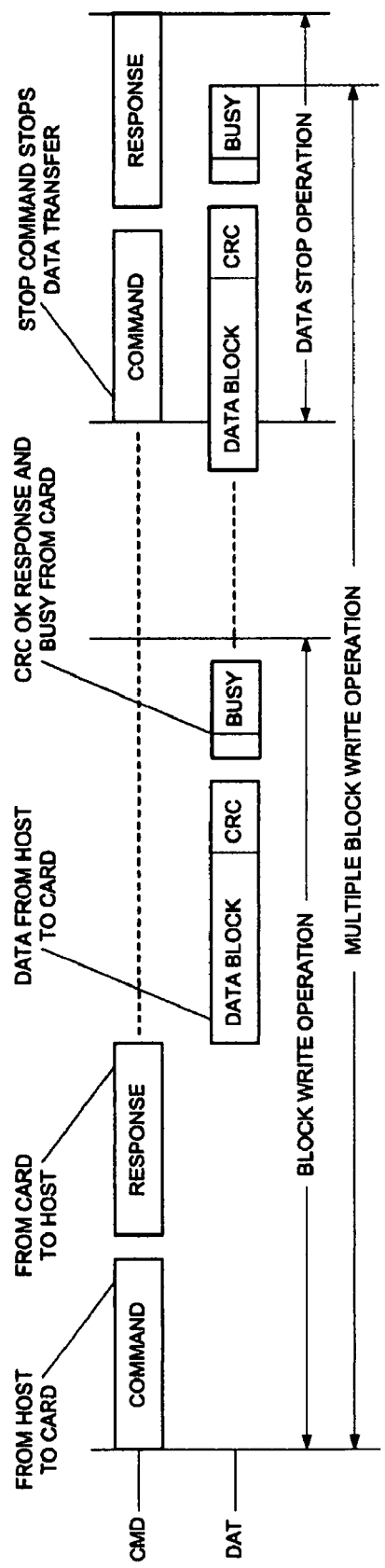
FIG. 6 shows a prior art multi-block format for an SD memory card.

At step 540 CE host 350 grants the storage access request by writing an access granted message to mailbox 328. The write operation at step 540 is performed as a multiple block write operation. Multi-block writes are described in the SD specification, Part I: Physical Layer, Simplified Specification Version 2.00, Sep. 25, 2006. In this regard, reference is made to FIG. 6, which shows a prior art multi-block format for an SD memory card.

At step 540, the first block of the mufti-block write includes the grant of access message, and the rest of the blocks are dummy blocks that are filled with zeros. At step 550 convergence controller 320 recognizes the first block of the message as a grant of access, and holds a busy state on the SD host bus before reading the second block, thereby forcing CE controller 355 to hold and not access the SD bus.

At step 560 base band modem 310 is notified that its access request was granted, via a dedicated interrupt line, by reading mailbox 328. Base band modem 310 can then proceed to access SD storage 340. At step 570 base band modem 310 performs its operations on SD storage 340. At step 580, upon completion of using SD storage 340, base band modem 310 writes a free message to convergence controller 320. Finally, at step 590 convergence controller 320 removes the busy state from the SD host bus.

Generally there is a timeout of 250 msec for a busy period. As such, convergence controller 320 ensures that access to SD storage 340 is shorter than this time.

Figure 7A:
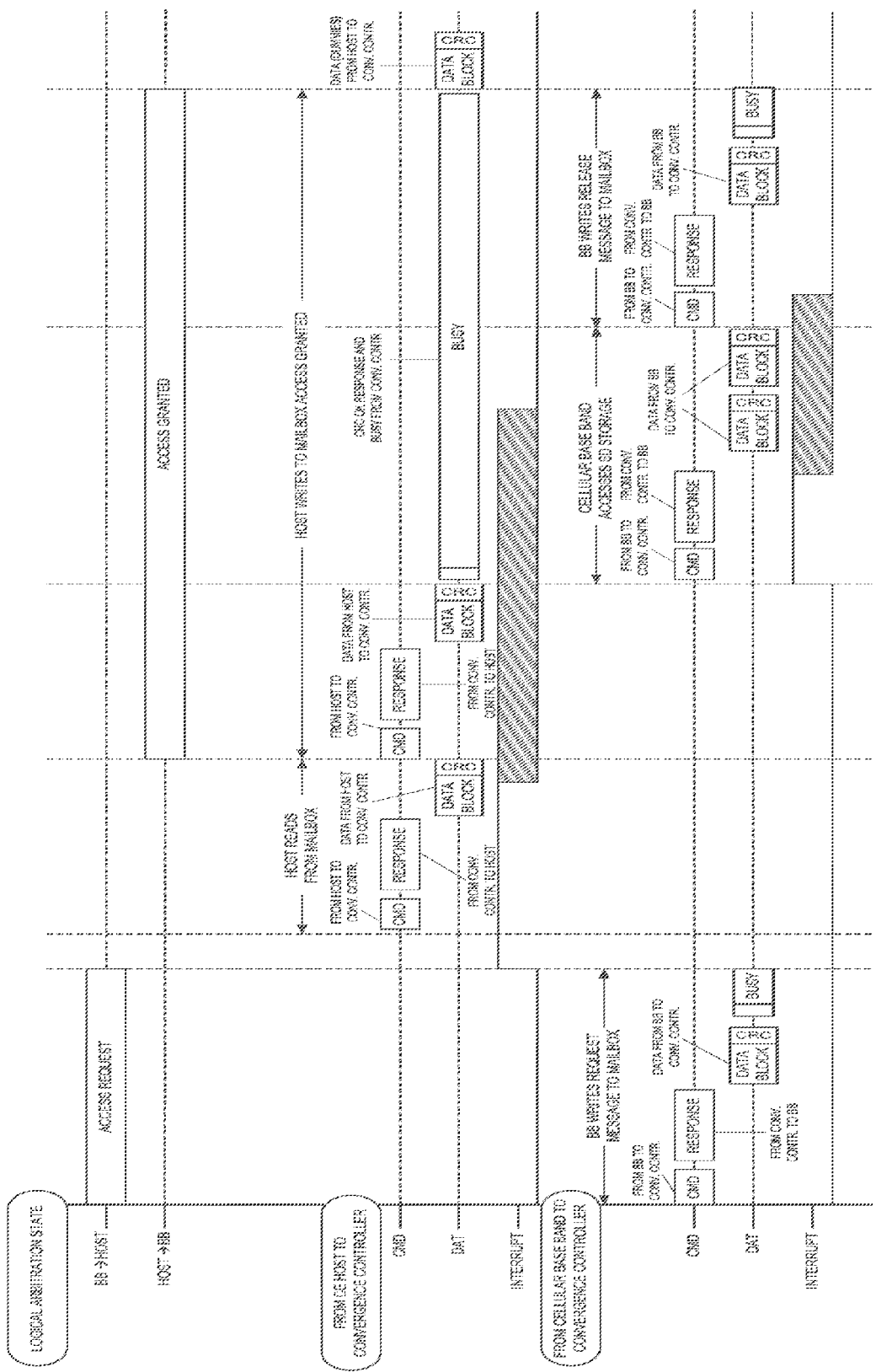
FIG. 7A is a simplified diagram illustrating a process of enabling a base band modem to access SD storage, where a convergence controller coordinates between the base band modem and a CE host, in accordance with a first embodiment of the present invention.

Reference is now made to FIG. 7A, which is a simplified diagram illustrating a process of enabling a base band modem to access SD storage, where a convergence controller coordinates between the base band modem and a CE host, in accordance with a first embodiment of the present invention. FIG. 7A is arranged as a time line advancing from left to right. Three types of data flow are illustrated along the time line; namely, a logical arbitration state, communication between CE host 350 and convergence controller 320, and communication between cellular base band modem 310 and convergence controller 320.

Logical arbitration involves a protocol for switching access to SD storage 340 between base band modem 310 and CE host 350, which share SD storage 340. As described hereinabove with respect to FIG. 5, arbitration operates by means of access requests and access grants written to mailboxes 327 and 328.

Communication between CE host 350 and convergence controller 320, and between cellular base band modem 310 and convergence controller 320, occurs via command signals, data signals and interrupt signals. Data blocks are followed by CRC error checking codes.

As shown in FIG. 7A, when cellular base band modem 310 wants to access SD storage 340, it writes an access request message to the BB→Host mailbox 327. Thereafter, convergence controller 320 issues an interrupt to CE host 350, informing it that there is a message waiting in mailbox 327. CE host 350 then reads the access request message in mailbox 327, and writes a multi-block access grant message to Host→BB mailbox 328. Convergence controller 320 recognizes the first block of the multi-block as an access grant message, and holds a busy state. Convergence controller 320 issues an interrupt to base band modem 310, indicating that access to SD storage 340 is granted. Base band modem 310 then accesses SD storage 340 and performs its requisite operations. Upon completion, base band modem 310 writes a release message to convergence controller 320, which then releases the busy state. In turn, CE host 350 is then able to write the second block (dummies) to Host→BB mailbox 328.

Figure 7B:
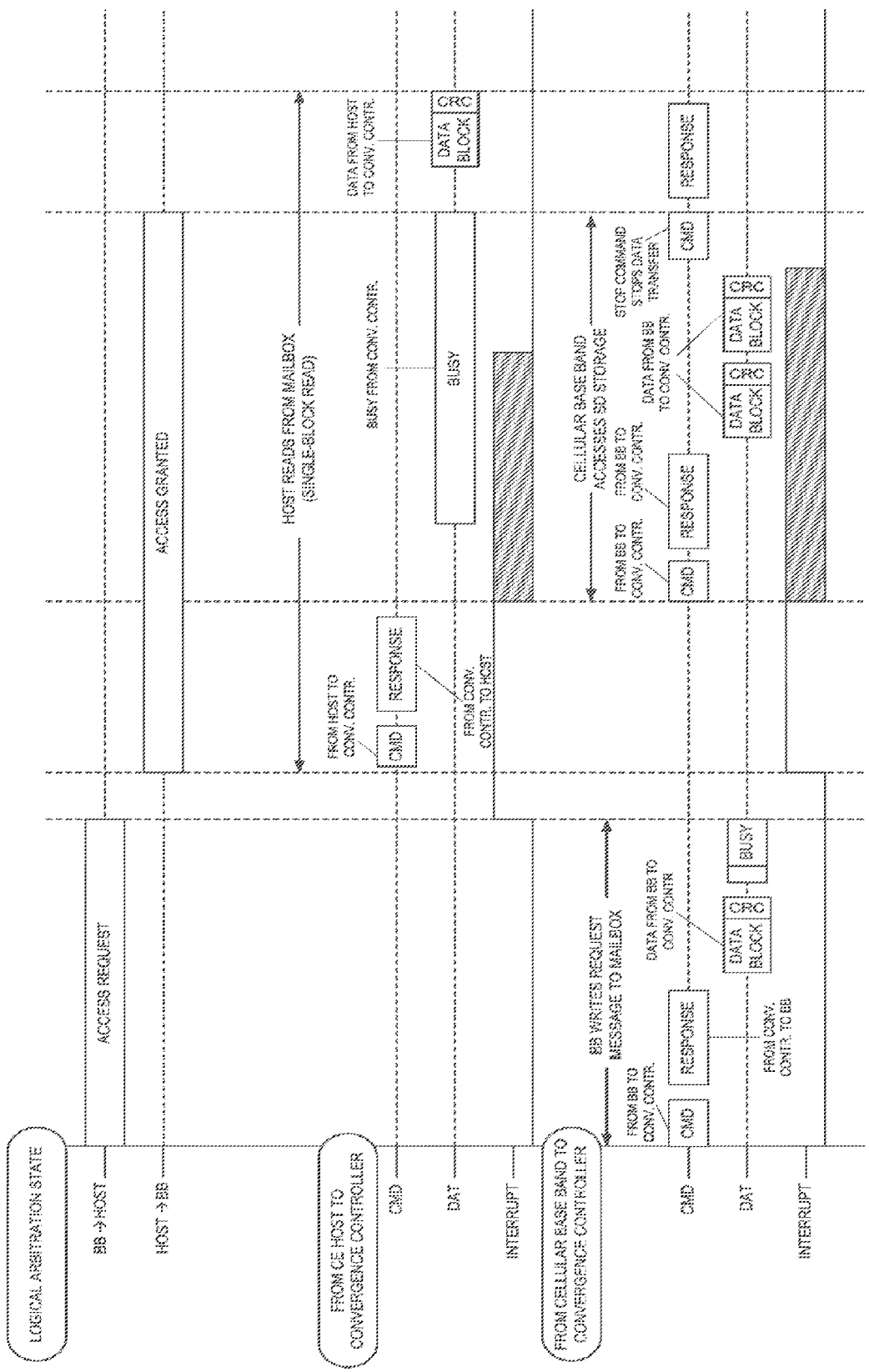
FIG. 7B is a simplified diagram illustrating a process of enabling a base band modem to access SD storage, where a convergence controller coordinates between the base band modem and a CE host, in accordance with a second embodiment of the present invention.

Reference is now made to FIG. 7B, which is a simplified diagram illustrating a process of enabling a base band modem to access SD storage, where a convergence controller coordinates between the base band modem and a CE host, in accordance with a second embodiment of the present invention. As shown in FIG. 7B, an access grant write command is not needed, and the reading of the base band modem access request suffices to trigger the busy state for CE host 350. Whereas in the embodiment of FIG. 7A a multi-block write by CE host 350 is used to generate the busy state, in the embodiment of FIG. 7B a single-block read suffices to initiate the busy state.

Sleep Mode for Base Band Modem 310

Base band modem 310 may be idle for a long period of time if no call or data exchange is underway and there is time to wait until a next signaling session with a cellular network. In such case, base modem 310 may drop to a sleep mode. Moreover, in order to conserve power consumption in sleep mode, base band modem 310 may shut off SDRAM power, which results in losing the code image on SDRAM 360. In order to enable proper operation, base band modem 310 maintains state parameters in internal SRAM 316. Alternatively, or in addition, base band modem backs up state parameters in internal SRAM 316 prior to going to sleep.

Figure 8:
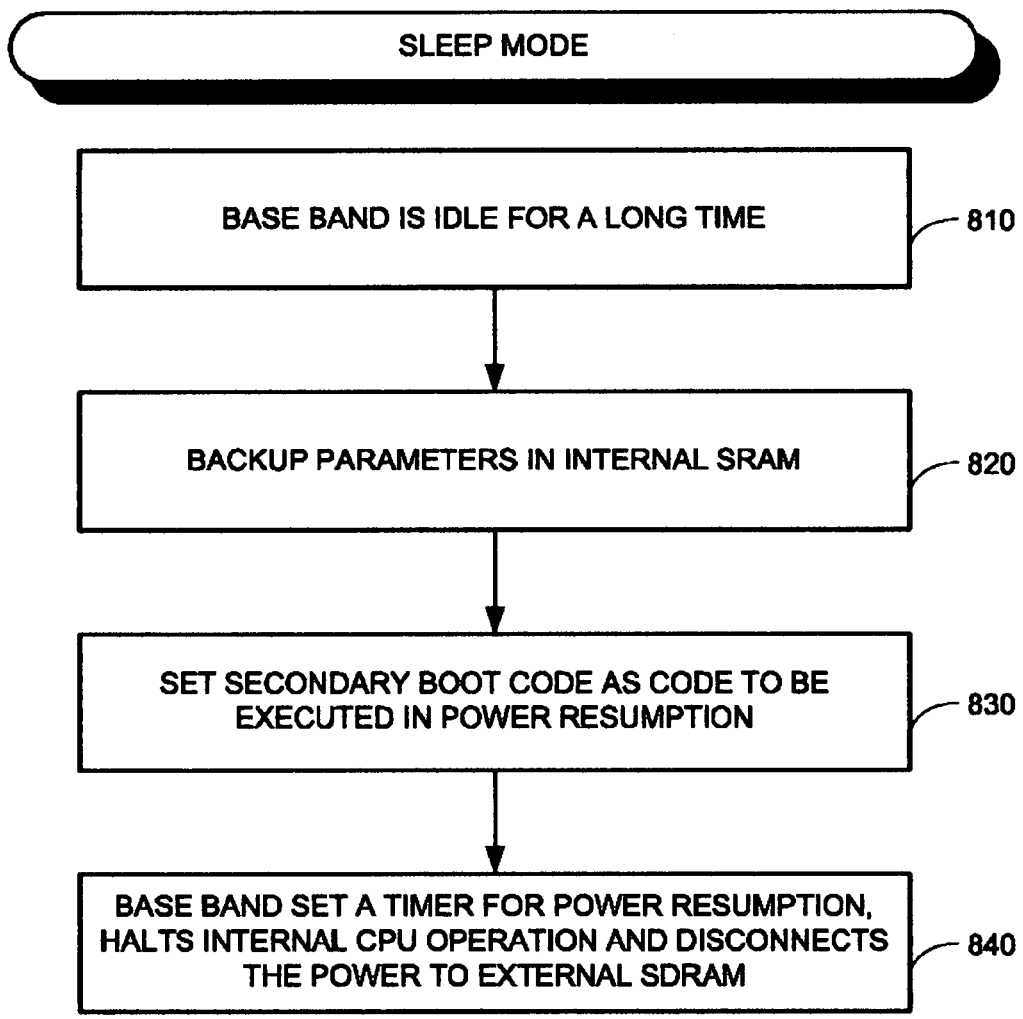
FIG. 8 is a simplified flowchart of a method for a sleep mode, in accordance with an embodiment of the present invention.

In this regard, reference is now made to FIG. 8, which is a simplified flowchart of a method for a sleep mode, in accordance with an embodiment of the present invention. At step 810 base band modem 310 is idle for a long period of time. At step 820 base band modem 310 backs up state parameters in internal SRAM 316. At step 830 base band modem sets the secondary boot code that was loaded to SRAM 316 at step 440 as the code to be executed upon resumption of power. At step 840 base band modem 310 sets a timer for resumption of power, halts internal CPU operation, and then disconnects power to external SDRAM 360.

Figure 9:
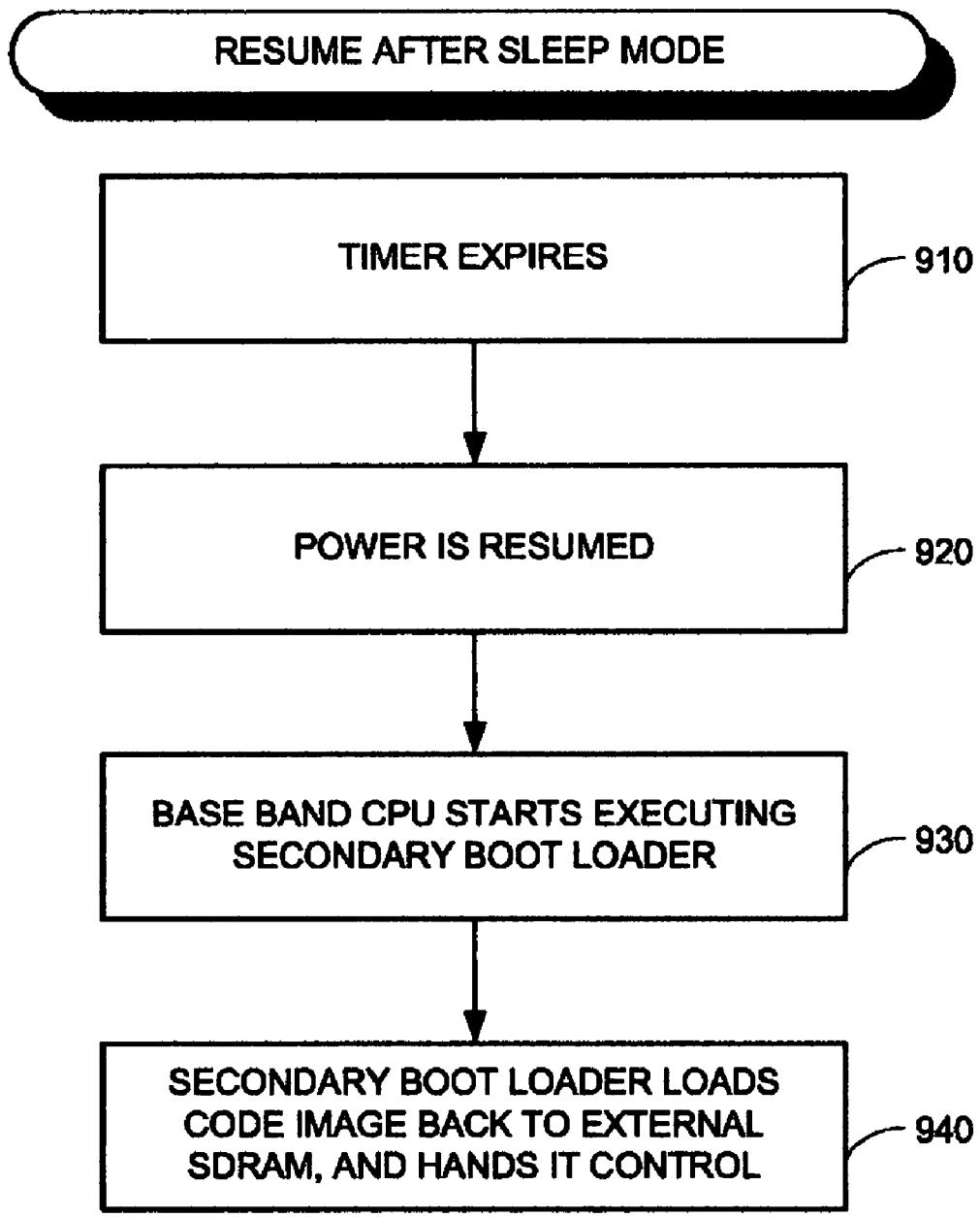
FIG. 9 is a simplified flowchart of a method for resuming operation after a sleep mode, in accordance with an embodiment of the present invention.

Reference is now made to FIG. 9, which is a simplified flowchart of a method for resuming operation after a sleep mode, in accordance with an embodiment of the present invention. At step 910 the timer that was set at step 840 expires. At step 920 power is resumed. At step 930 base band modem 310 begins executing the secondary boot code, based on the setup defined at step 830. Finally, at step 940 the secondary boot code loads the code image into external SDRAM 360, and transfers control thereto.

Figure 10:
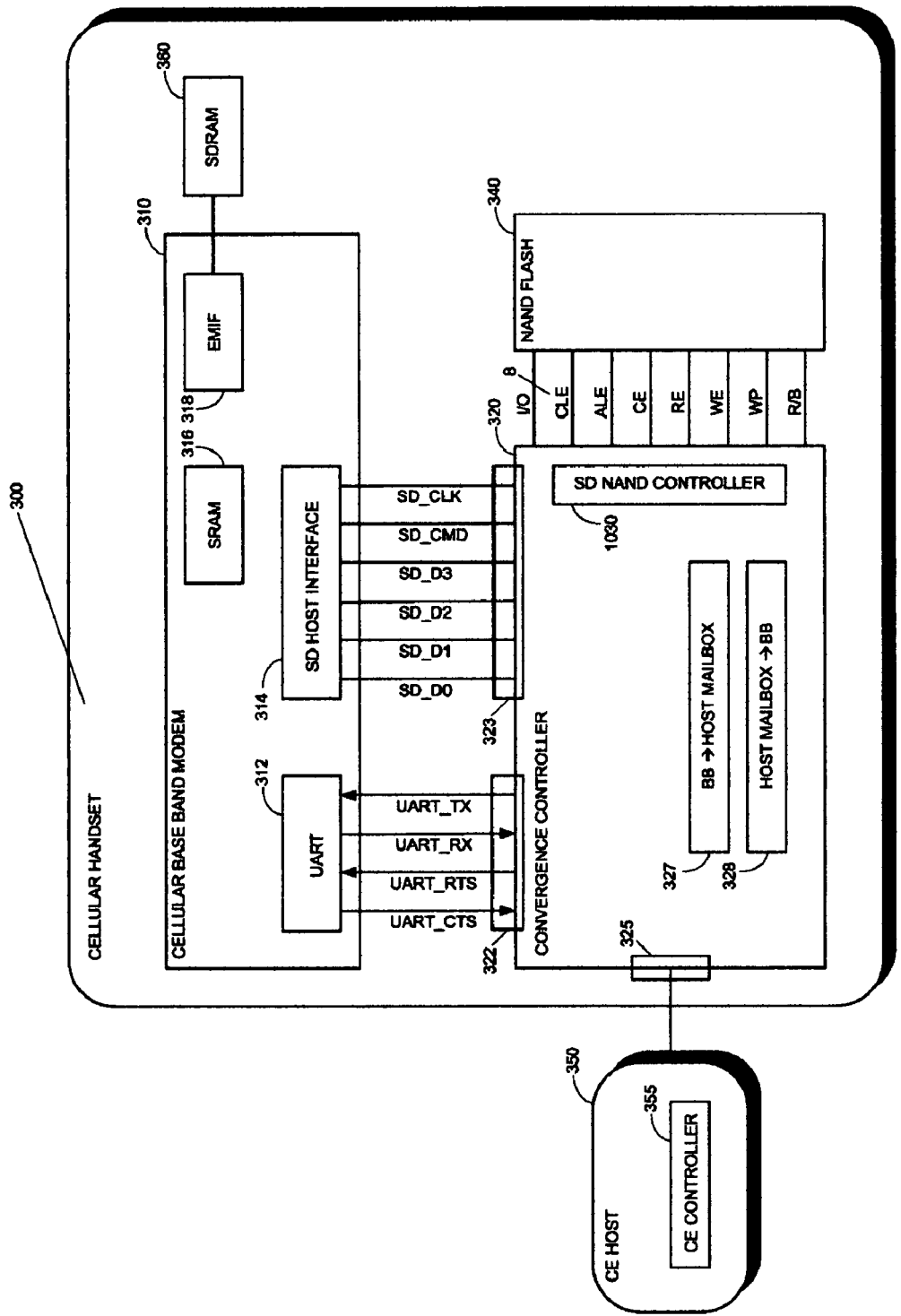
FIG. 10 is a simplified block diagram of a cellular handset, in accordance with a second embodiment of the present invention.

In reading the above description, persons skilled in the art will realize that there are many apparent variations that can be applied to the methods and systems described. In particular, components of FIG. 3 that are shown integrated may be separated, and components that are shown as separated may be integrated. In this regard, reference is now made to FIG. 10, which is a simplified block diagram of a cellular handset, in accordance with a second embodiment of the present invention. In the embodiment illustrated in FIG. 10, an SD NAND controller 1030 is integrated within convergence controller 320. In distinction, SD NAND controller 330 is external to convergence controller 320 in FIG. 3.

When SD NAND controller 1030 is integrated within convergence controller 320, convergence controller 320 can directly access NAND flash 340. As such, at step 420 of FIG. 4, convergence controller 320 reads the boot code image directly from NAND flash 340, without using an external NAND controller.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for arbitrating between a host device and a cellular base band modem for use of a shared SD storage, comprising:
   requesting, by a cellular base band modem from a host device, access to an SD storage, comprising writing an access request message;
   notifying the host device of the access request message;
   reading, by the host device, the access request message;
   granting, by the host device, the access request, comprising writing an access grant message as the first block of a multi-block write;
   notifying the cellular base band modem of the access grant message;
   reading, by the cellular base band mode, the access grant message;
   holding an SD host bus in a busy state, comprising preventing the host device from writing subsequent blocks of the mufti-block write, thereby forcing the host device to hold and not access the bus;
   accessing, by the cellular base band modem, the SD storage; and
   upon completion of said accessing, removing the busy state from the SD host bus.

2. The method of claim 1 wherein said writing an access request message comprises writing the access request message to a first mailbox.

3. The method of claim 1 wherein said writing an access grant message comprises writing the access grant message to a second mailbox.

4. The method of claim 1 wherein said notifying the host device comprises issuing an interrupt to the host device.

5. The method of claim 1 wherein said notifying the cellular base band modem comprises issuing an interrupt to the cellular base band modem.

6. The method of claim 1 further comprising limiting said accessing to no longer than a busy period timeout.

7. The method of claim 1 further comprising, upon completion of said accessing, writing, by the cellular base band modem, a release message.

8. The method of claim 1 wherein the host device is a member of the group consisting of a media player, a PDA and a GPS navigational system.

9. A method for arbitrating between a host device and a cellular base band modem for use of a shared SD storage, comprising:
- requesting, by a cellular base band modem from a host device, access to an SD storage, comprising writing an access request message as the first block of a mufti-block write;
- notifying the host device of the access request message;
- reading, by the host device, the access request message;
- holding an SD host bus in a busy state, comprising preventing the host device from writing subsequent blocks of the mufti-block write, thereby forcing the host device to hold and not access the bus;
- accessing, by the cellular base band modem, the SD storage; and
- upon completion of said accessing, removing the busy state from the SD host bus.

10. The method of claim 9 wherein said writing an access request message comprises writing the access request message to a mailbox.

11. The method of claim 9 wherein said notifying the host device comprises issuing an interrupt to the host device.

12. The method of claim 9 further comprising limiting said accessing to no longer than a busy period timeout.

13. The method of claim 9 further comprising, upon completion of said accessing, writing, by the cellular base band modem, a release message.

14. The method of claim 9 wherein said holding comprises preventing the host device from performing a single block read.

15. The method of claim 9 wherein the host device is a member of the group consisting of a media player, a PDA and a GPS navigational system.

* * * * *